US010642700B2

(12) United States Patent
Kim et al.

(10) Patent No.: US 10,642,700 B2
(45) Date of Patent: May 5, 2020

(54) SYSTEM, METHOD AND RECORDING MEDIUM FOR ANTIFRAGILE COMPUTING PROBLEM MANAGEMENT

(71) Applicant: International Business Machines Corporation, Armonk, NY (US)

(72) Inventors: Minkyong Kim, Scarsdale, NY (US); Min Li, San Jose, CA (US); Clifford A. Pickover, Yorktown Heights, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

(21) Appl. No.: 15/834,440

(22) Filed: Dec. 7, 2017

(65) Prior Publication Data
US 2018/0107557 A1    Apr. 19, 2018

Related U.S. Application Data

(63) Continuation of application No. 15/196,129, filed on Jun. 29, 2016, now Pat. No. 9,934,095.

(51) Int. Cl.
*G06F 11/07*    (2006.01)
*G06F 11/14*    (2006.01)
*G06F 8/658*    (2018.01)

(52) U.S. Cl.
CPC .......... *G06F 11/1484* (2013.01); *G06F 8/658* (2018.02); *G06F 2201/815* (2013.01)

(58) Field of Classification Search
CPC .......................... G06F 11/0712; G06F 11/1469
USPC ........................................................... 714/15
See application file for complete search history.

(56) References Cited

U.S. PATENT DOCUMENTS

| | | | |
|---|---|---|---|
| 6,487,677 B1 * | 11/2002 | Jantz | G06F 11/0748 714/2 |
| 2006/0026548 A1 * | 2/2006 | Roesner | G06F 17/5022 716/102 |
| 2007/0050686 A1 * | 3/2007 | Keeton | G06F 11/261 714/48 |
| 2008/0126857 A1 * | 5/2008 | Basham | G06F 11/004 714/25 |
| 2009/0144579 A1 | 6/2009 | Swanson | |
| 2009/0307597 A1 | 12/2009 | Bakman | |
| 2010/0306371 A1 * | 12/2010 | Osmond | H04N 21/00 709/224 |
| 2013/0275808 A1 | 10/2013 | McNeeney et al. | |
| 2014/0007107 A1 * | 1/2014 | Nachum | G06F 9/46 718/100 |

(Continued)

OTHER PUBLICATIONS

United States Notice of Allowance dated Nov. 21, 2017 in U.S. Appl. No. 15/196,129.

*Primary Examiner* — Chae M Ko
(74) *Attorney, Agent, or Firm* — Anthony Curro, Esq.; McGinn IP Law Group, PLLC (57) ABSTRACT

A computing problem management method, system, and non-transitory computer readable medium, include detecting an impending problem of a computing system, spawning a plurality of replicas when the detecting detects the impending problem, and launching a plurality of versions of an action, each version being launched and performed on a different replica of the plurality of replicas.

18 Claims, 4 Drawing Sheets

COMPUTING PROBLEM MANAGEMENT METHOD 100

(56) References Cited

U.S. PATENT DOCUMENTS

| | | | |
|---|---|---|---|
| 2014/0068330 A1* | 3/2014 | Hecox | G06F 11/0706 |
| | | | 714/26 |
| 2014/0129187 A1* | 5/2014 | Mazzaro | G06F 17/5009 |
| | | | 703/2 |
| 2015/0378835 A1* | 12/2015 | Liu | G06F 11/1448 |
| | | | 707/647 |
| 2016/0085738 A1 | 3/2016 | Briggs | |

* cited by examiner

SYSTEM, METHOD AND RECORDING MEDIUM FOR ANTIFRAGILE COMPUTING PROBLEM MANAGEMENT

CROSS-REFERENCE TO RELATED APPLICATIONS

The present application is a Continuation Application of U.S. patent application Ser. No. 15/196,129, filed on Jun. 29, 2016, the entire contents of which are hereby incorporated by reference.

BACKGROUND

The present invention relates generally to a computing problem management method, and more particularly, but not by way of limitation, to a system, method, and recording medium for spawning multiple replicas to pre-emptively fix a computing problem (e.g., an impending system crash, etc.).

Conventional techniques to fix computing problems have considered a virtual machine monitor (VMM) in a data processing system which handles errors involving virtual machines (VMs) in the processing system. For instance, the conventional techniques have considered an error manager in the VMM that may detect an uncorrectable error in involving a component associated with a first VM in the processing system. In response to detection of that error, the error manager may terminate the first VM, while allowing a second VM in the processing system to continue operating. In one embodiment, the error manager automatically determines which VM is affected by the uncorrectable error, in response to detecting the uncorrectable error. The error manager may also automatically spawn a new VM to replace the first VM, if the processing system has sufficient resources to support the new VM. Other embodiments are described and claimed. However, the conventional techniques are limited by resources for the virtual machines and because of the limited resources; few VMs can run on the system, which allows the problem (e.g., a system crash) to occur before the VMs can eliminate the problem.

That is, the inventors have identified a technical problem that because computer systems are extremely complex, there will be errors, faults, mistakes, miscomputations, etc. that inevitably lead to a system problem. Even in a well-tested system, errors, faults, mistakes, miscomputations, etc. will occur during a run-time of the computer system that will lead to a system problem.

SUMMARY

Thus, the inventors have realized a technical solution to the technical problem to satisfy a long-felt need in computer systems and to improve a computer-technology (e.g., to limit (prevent) problems of a computer system) by spawning multiple replicas in an environment having unlimited resources (e.g., cloud computing), each replica can run a different type of action to the problem (e.g., a solution to fix the errors, faults, mistakes, miscomputations, etc.) of the system in real-time to prevent a problem. And, via learning from a successful replica of the spawned replicas, the inventors have realized that the system may become so-called "antifragile" such that a replica can be spawned for each error in real-time, thereby preventing all system problems by using the realized technical solution.

In an exemplary embodiment, the present invention can provide a computing problem management method, the method including detecting an impending problem of a computing system, spawning a plurality of replicas when the detecting detects the impending problem, and launching a plurality of versions of an action, each version being launched and performed on a different replica of the plurality of replicas.

Further, in another exemplary embodiment, the present invention can provide a non-transitory computer-readable recording medium recording a computing problem management program, the program causing a computer to perform: detecting an impending problem of a computing system, spawning a plurality of replicas when the detecting detects the impending problem, and launching a plurality of versions of an action, each version being launched and performed on a different replica of the plurality of replicas.

Even further, in another exemplary embodiment, the present invention can provide a computing problem management system, said system including a processor, and a memory, the memory storing instructions to cause the processor to: detect an impending problem of a computing system, spawn a plurality of replicas when the detecting detects the impending problem, and launch a plurality of versions of an action, each version being launched and performed on a different replica of the plurality of replicas.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
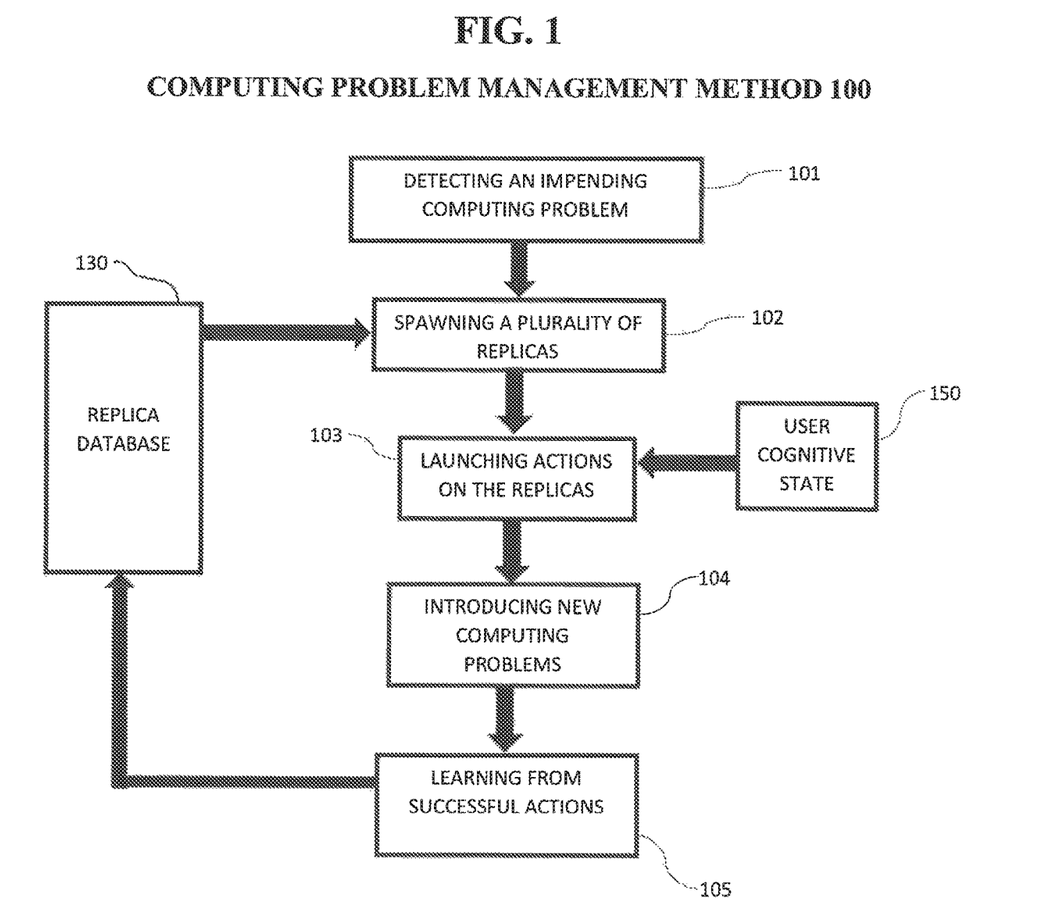
FIG. 1 exemplarily shows a high-level flow chart for a computing problem management method 100.

With reference now to FIG. 1, the computing problem management method 100 includes various steps to limit (prevent) an impending computing problem (e.g., a computer crash) resulting from an impending software or hardware status change, state change, hardware faults, etc. by spawning replicas that launch actions to prevent the impending computing problem. Moreover, the method (system) can benefit from "learning" from past fixes to computing problems (e.g., through feedback) to create an antifragile computing system. As shown in at least FIG. 3, one or more computers of a computer system 12 can include a memory 28 having instructions stored in a storage system to perform the steps of FIG. 1.

With the use of these various steps and instructions, the computing problem management method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 2:
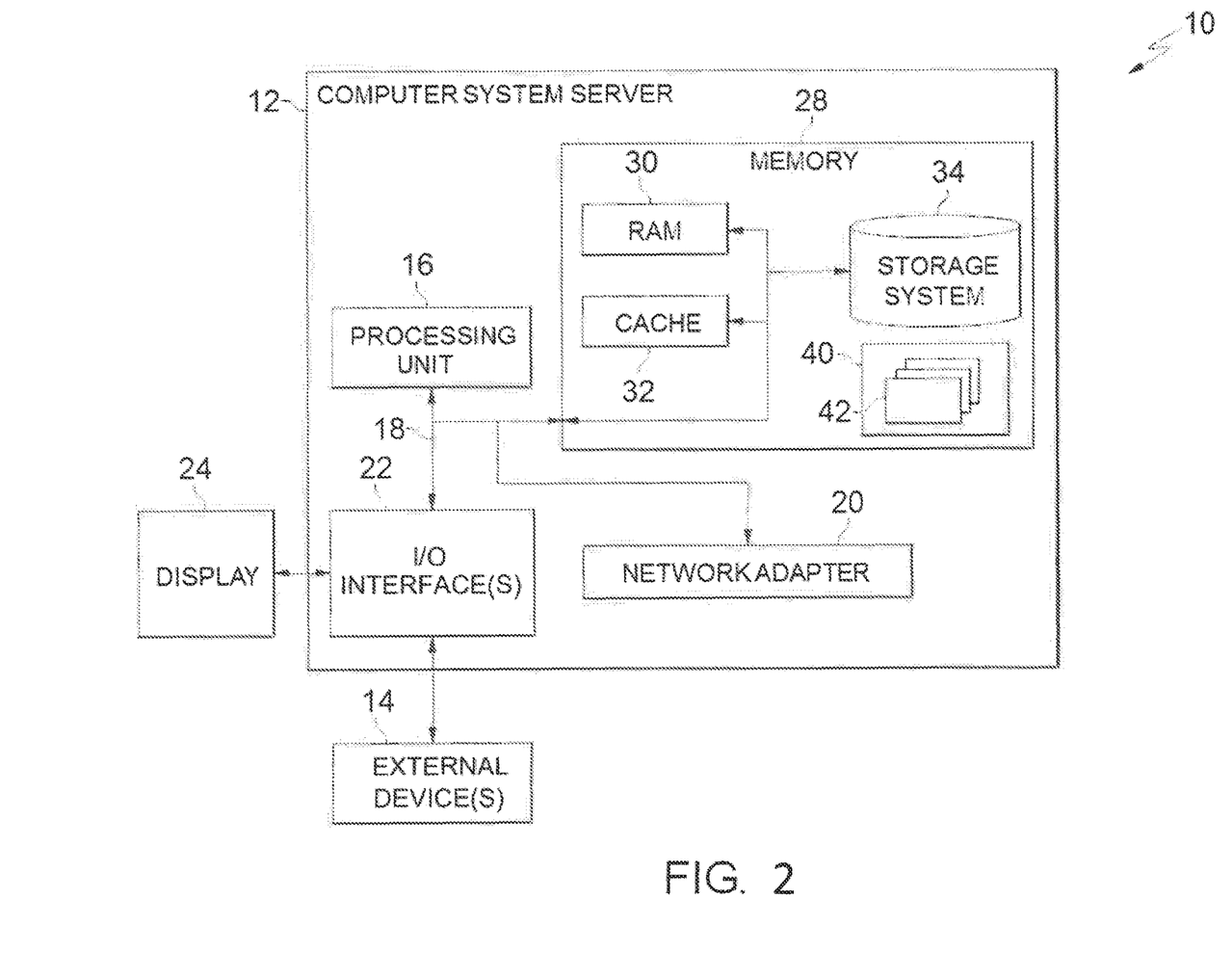
FIG. 2 depicts a cloud-computing node according to an embodiment of the present invention.
Figure 3:
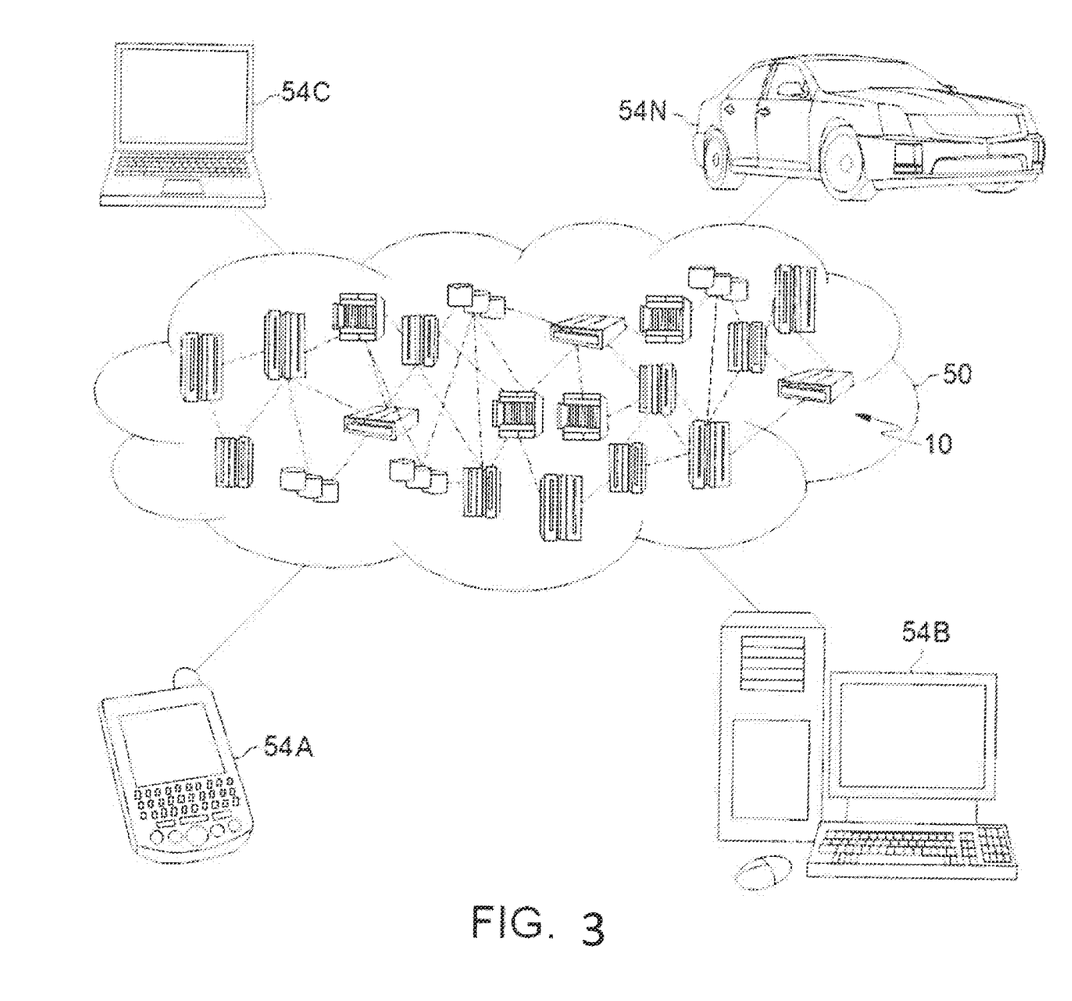
FIG. 3 depicts a cloud-computing environment according to another embodiment of the present invention.
Figure 4:
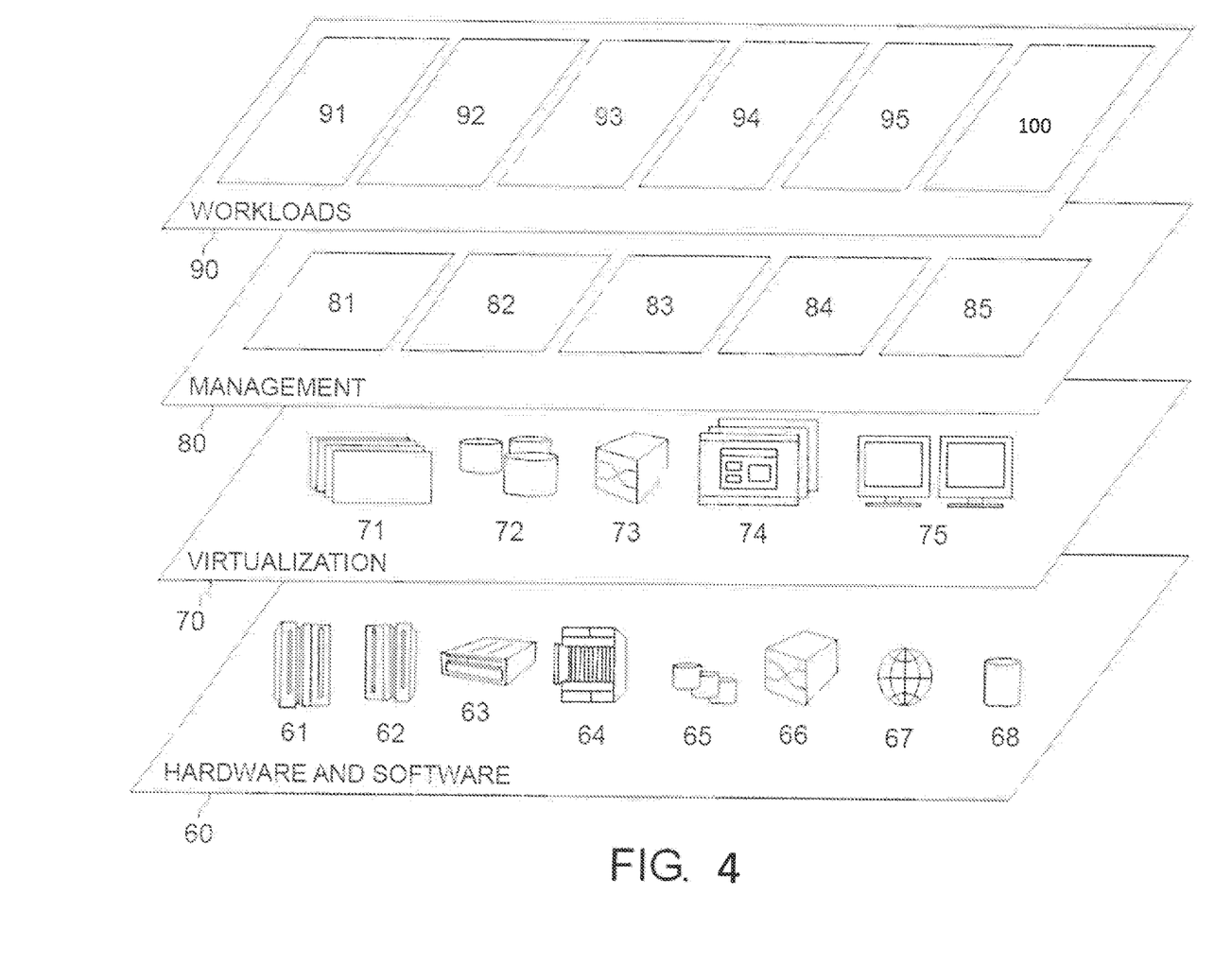
FIG. 4 depicts abstraction model layers according to an embodiment of the present invention.

Although as shown in FIGS. 2-4 and as described later, the computer system/server 12 is exemplarily shown in cloud computing node 10 as a general-purpose computing circuit which may execute in a layer the computing problem management system method (FIG. 3), it is noted that the present invention can be implemented outside of the cloud environment.

Step 101 detects an impending problem of a computing system (e.g., a computer, a smart phone, a smart watch, a head-mounted display, a game console, network components (such as a router), etc. The impending problem comprises an impending device software or hardware status change (e.g., a fault, system crash, hard-to-recover state, slowness, etc.), a desired state change (e.g., installing a device driver to make a new peripheral work), hardware faults (e.g., writing to memory and disks), etc. It is noted that Step 101 can detect the impending problem automatically or the impending problem can be suggested by a user when some aspect of device usage appears to be amiss (e.g., computing system running too slow, response time slow, etc.).

In response to the detection by Step 101, Step 102 spawns a plurality of replicas (e.g., Virtual Machines (VMs), containers, etc.) of a system in an environment with an "unlimited" resource (e.g., a cloud environment). A fractal spawning of replicas can be done by Step 102, with children replicas having some relationship of parameters with the parent replica.

Each of the replicas is capable of performing a different action to resolve, limit, and/or prevent the impending computing problem.

Step 103 launches a different action on each of the replicas for potentially resolving the impending computing problem. That is, various versions of the actions are automatically launched on the replicas (e.g., each replica performs a different action to resolve the computing problem). Once the actions are performed by the replicas, the resulting state of replicas is presented to the user to be chosen or the best result can be chosen, automatically.

The actions include, for example, software patches, different version of patches, possible solutions to prevent a system crash, and changes in timing of how the actions are spaced. The actions can also include a spread of actions, such as a spread of patches from a narrow range of dates or a wide range of dates (e.g., a plurality of patches for a system during a predetermined period of time such that the replicas each perform all of the actions within the predetermined period of time to find the one of the patches that can resolve the computing problem). Each action may have an associated with risk, which also has a spread of values (e.g., some actions may delete other files, cause data to be lost, etc.).

The various versions of actions can be retrieved from various resources of a replica database 130 such as help pages, red books, web community, blogs, etc. The existing text mining techniques can be applied to extract the list of actions (e.g., a "recipe") from these resources. The successful recipes can be saved in the replica database 130 for further use. In other words, the actions can be based on past actions of other replicas resolving a similar problem.

Step 103 can choose which actions to launch by, for example, genetic algorithms where random selection is introduced. From a set of known "recipes", Step 103 can create modified actions by adding extra steps (randomly) or replacing a few steps with other actions chosen "randomly" to find a better cure for the computing problem.

Other kinds of parameter and action variations may be triggered according to various distributions, with an eye toward white noise, Gaussian noise, voting, learning, a controlled spread relating to mean and standard deviation, multidimensional distributions, etc. For example, a conservative approach can select actions to launch by Step 103 from a set that has a multivariate normal distribution which includes spreads along a range of patches, a date of the patch, experimental patches, beta patches, risk levels, etc. Alternatively, a wider distribution can be used of tests and trials in a parameter space for actions that can resolve the computing problem to help "save" a user from an impending crash. Other noise distributions of trial parameters may be tried, such as white, pink, and brown noise distributions. Parameters tried can relate to different version of patches (e.g., a date distribution), changes in timing of how actions are spaced, etc.

That is, each replica includes a different version of the action or modified version such that when Step 103 launches the actions on the replicas, each action realizes a different potential resolution to the computing problem. By spawning the plurality of replicas in Step 102 based on an "unlimited" resource environment such as a cloud-computing network, the amount of actions that can be performed is greatly increased versus the capability of a single system launching replicas.

The number of replicas spawned by Step 102 can be chosen considering a cost (money, time, resources, etc.) to launch the replicas and testing out the actions. The number of replicas may also be chosen considering the criticality of the resulting state.

Also, a number N (where N is an integer), a location, and a nature of the launched actions on the replicas by Steps 102 and Step 103 can be controlled by a cognitive characteristics of the user 150 (e.g. a current distraction level of the user, an ability of a user to handle a particular nature and number of VMs, etc.) That is, Step 103 chooses the actions automatically, but in other cases, for example, some users may want to study the actions and be active participants in selecting one or more actions for the replicas. In these cases, a user may be able to handle and assess presented replicas based on any of: a user distraction level (e.g. as determined by a number of open windows already on screen), a cohort of a user (e.g., autism, pre-Alzheimer's, child, fatigue level, experience level with a particular application or class of applications, history of use, job title, etc.), a size of screen being used (e.g. a large display versus a small display), etc. On the other hand, an advanced user with a particular history may actually appreciate seeing more presented replicas, along with a readout of what the differences are among the presented replicas. That is, the number of replicas spawned by Step 102 can vary according to the cognitive state of the user.

Step 104 can introduce new computing problems (simulate a computing problem) by introducing mistakes, faults, attacks, or failures on the replicas to make the system "antifragile". In other words, Step 104 can create potential computing problems that the actions launched by Step 103 can resolve the potential computing problems before the problem occurs such that when the computing problem occurs in real-time, the replica database 130 includes the action to resolve the computing problem in advance. In this manner, the method 100 can create an "antifragile" computing system. It is noted that antifragility refers to systems that increase in capability, resilience, or robustness as a result of past mistakes, faults, attacks, or failures.

Further, Step 105 learns the successful actions for a computing problem of the replicas and stores the successful actions in the replica database 130. That is, Step 105 learns a starting state leading to the computing problem, the actions taken on the replica, and a success of the action can be saved for the future use. Also, a selected resulting state (e.g., the surviving combination) can be analyzed by Step 105 to learn the properties to improve future actions. For example, a successful action combination might have a certain patch version applied, or missed certain software to install. These properties are learned for the future spawning of resources in the imminence of a failure, and are repeated as ones of the combinations tried.

The success of the resulting state can be measured by user selection or automatically determined. Step 105 decides the successfulness of the resulting state based on the various metrics according to different recovering goals. For example, if a driver has not malfunctioned, the installation status can be used to judge the successfulness of the resulting state.

That is, while adaptive systems allow for robustness under a variety of scenarios (e.g., often unknown during system design), adaptive systems are not necessarily antifragile. In other words, the difference between antifragile and adaptive is the difference between a system that is robust under volatile environments/conditions, and one that is robust in an previously unknown environment. Thus, by Step 104 introducing new computing problems and Step 105 learning from the problems, the method 100 can create an antifragile system that can never fail because every solution to every problem can potentially be pre-worked out by the learning.

In one embodiment, when Step 101 detects the impending computing problem, the computing system can be slowed down to give additional time to launch the actions (and the user may be notified of this intentional slowdown). For example, if an impending problem is detected and the computing system is about to crash, the window may turn pink and the interactions of the user and the system become slightly slower, as Step 102 "rushes" to spawn replicas in rapid experiments to launch actions to resolve the impending computing problem. In other words, the processes of the computing system can be slowed such that the actions launched on the spawned replicas have more time to resolve the impending problem before the system crash. Or, the timing or nature of the slowing of the computing system can be based on the user cognitive state 150 (e.g., such as user experience level, user cohort, level of distraction, etc.). Or, the timing or nature of the slowing could be profile based depending on the user or type of computing system.

A success of the action (or versions of the action) is automatically determined if the computing system continues to operate (e.g., does not crash). Or, the success of the action can be determined by a user confirming that the impending problem has subsided.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 2, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pro-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computing problem management method, the method comprising:
    launching a plurality of versions of an action, each version being launched and performed on a different replica of a computing system,
        wherein the each version of the replica includes one of a mistake, a fault, an attack, and a failure for the action to resolve while running the action on the computing system, and
        wherein each version of the replica includes a different one of the mistake, the fault, the attack, and the failure for the action to resolve, and
        wherein a number of the plurality of replicas is based on a criticality of resolving an impending problem, further comprising:
            detecting an impending problem of the computing system;
            spawning the plurality of replicas when the detecting detects the impending problem;
            introducing a plurality of new impending problems on the plurality of replicas for the launching to launch versions of the action to resolve; and
            learning a version that resolves each of the of new impending problems,
            wherein the launching decides the plurality of versions of the action to launch based on a genetic algorithm including a random selection.

2. The method of claim 1, wherein each replica including a version of the action is presented to a user for selection by the user as to which version to perform, and
    wherein each replica performs a different version of the plurality of versions of the action to resolve the computing problem.

3. The method of claim 1, further comprising:
    introducing a plurality of new impending problems on the plurality of replicas for the launching to launch versions of the action to resolve; and
    learning a version that resolves each of the plurality of new impending problems to thereby create an antifragile computing system,
    wherein a number of the replicas with the actions launched is based on the cost.

4. The method of claim 1, wherein the action comprises any one of:
    a software patch;
    different versions of the software patch;
    a known solution to the impending problem;
    a potential solution to the impending problem; and
    a change in a time of implantation of the action.

5. The method of claim 1, wherein the launching decides the plurality of versions of the action to launch based on any of:
    a genetic algorithm including a random selection;
    a white noise;
    a Gaussian noise;
    a voting;
    a controlled spread relating to a mean and a standard deviation; and
    a multidimensional distribution.

6. The method of claim 1, further comprising learning successful versions of the action based on a prior starting state, the version of the action, and a result of the version of the action.

7. The method of claim 1, wherein a number, a location on the computing system, and a type of the versions of the action of the plurality of replicas are based on a cognitive state of a user.

8. The method of claim 1, wherein, if the detecting detects the impending problem, a processing speed of the computing system is decreased.

9. The method of claim 1, wherein, if the detecting detects the impending problem, a processing speed of the computing system is decreased such that the plurality of versions of the action are performed by the plurality of replicas at a rate faster than a rate of propagation of the impending problem in the computing system.

10. The method of claim 1, wherein the spawning spawns the plurality of replicas in a cloud-computing system.

11. The method of claim 1, wherein the spawning spawns the plurality of replicas in an environment with an unlimited resource.

12. The method of claim 1, wherein the spawning spawns a plurality of children replicas having a relationship to a replica of the plurality of replicas, and
    wherein each of the plurality of children replicas includes a modified action of the replica with the relationship to the plurality of children replicas.

13. The method of claim 1, wherein the impending problem comprises a system crash.

14. The method of claim 1, wherein the impending problem comprises any of:
    an impending device software or hardware status change including a fault, a system crash, a hard-to-recover state, and a speed of the impending device;
    a state change; and
    a hardware fault.

15. The method of claim 1, wherein the computing system comprises any of:
    a computer;
    a smart phone;
    a smart watch;
    a head-mounted display;
    a game console; and
    a network component.

16. The method of claim 1, wherein a success of the action is automatically determined if the computing system continues to operate.

17. A non-transitory computer-readable recording medium recording a computing problem management program, the program causing a computer to perform:
    launching a plurality of versions of an action, each version being launched and performed on a different replica of a computing system,
        wherein the each version of the replica includes one of a mistake, a fault, an attack, and a failure for the action to resolve while running the action on the computing system, and
        wherein each version of the replica includes a different one of the mistake, the fault, the attack, and the failure for the action to resolve, and
        wherein a number of the plurality of replicas is based on a criticality of resolving an impending problem,
        further comprising;
            detecting an impending problem of the computing system;

spawning the plurality of replicas when the detecting detects the impending problem;

introducing a plurality of new impending problems on the plurality of replicas for the launching to launch versions of the action to resolve; and learning a version that resolves each of the plurality of new impending problems, wherein the launching decides the plurality of versions of the action to launch based on a genetic algorithm including, a random selection.

18. A computing problem management system, said system comprising:

a processor; and a memory, the memory storing instructions to cause the processor to perform:

launching a plurality of versions of an action, each version being launched and performed on a different replica of a computing system, wherein the each version of the replica includes one of a mistake, a fault, an attack, and a failure for the action to resolve while running the action on the computing system, and wherein each version of the replica includes a different one of the mistake, the fault, the attack, and the failure for the action to resolve, and wherein a number of the plurality of replicas is based on a criticality of resolving an impending problem, further comprising:

detecting an impending problem of the computing system;

spawning the plurality of replicas when the detecting detects the impending problem;

introducing a plurality of new impending problems on the plurality of replicas for the launching to launch versions of the action to resolve; and learning a version that resolves each of the plurality of new impending problems, wherein the launching decides the plurality of versions of the action to launch based on a genetic algorithm including a random selection.

* * * * *